United States Patent [19]

Page et al.

[11] 4,324,834
[45] Apr. 13, 1982

[54] INSULATION MEANS AND METHOD

[75] Inventors: Edward J. Page, Hampton; James E. Rock, Norfolk, both of Va.

[73] Assignee: NRG Research Laboratories, Inc., Newport News, Va.

[21] Appl. No.: 156,864

[22] Filed: Jun. 5, 1980

[51] Int. Cl.³ .................... B32B 5/16; B32B 5/18; B32B 9/04
[52] U.S. Cl. .................. 428/312.6; 52/309.11; 52/404; 52/743; 156/77; 428/35; 428/71; 428/323; 428/331; 428/403; 428/404; 428/313.7; 428/316.6
[58] Field of Search ............. 428/310, 312, 315, 311, 428/313, 35, 68, 306, 71, 323, 331, 403, 404; 52/743, 309.11, 404; 156/77

[56] References Cited

U.S. PATENT DOCUMENTS

| | | | |
|---|---|---|---|
| 3,512,327 | 5/1970 | La Padura | 428/322 |
| 3,709,772 | 1/1973 | Rice | 428/312 |
| 3,785,913 | 1/1974 | Hallamore | 428/310 |
| 3,978,264 | 8/1976 | Tarbell et al. | 428/315 |
| 4,107,376 | 8/1978 | Ishikawa | 428/306 |
| 4,130,687 | 12/1978 | Ballard et al. | 428/310 |
| 4,177,618 | 12/1979 | Felter | 52/743 |

FOREIGN PATENT DOCUMENTS

| | | | |
|---|---|---|---|
| 51-46717 | 4/1976 | Japan | 428/310 |
| 918123 | 2/1963 | United Kingdom | 428/310 |

*Primary Examiner*—William J. Van Balen
*Attorney, Agent, or Firm*—Mills & Coats

[57] ABSTRACT

This invention is an improved insulation means and a method of forming the same. An expanded ceramic material such as expanded perlite, with a calculated R-rating of 2.7 per inch, and urethane foam, with a R-rating of 7 per inch under American Society for Testing Methods (ASTM), are combined to more than triple the expected R-rating of the sum of the two. The methods of forming the improved insulation can be used for either original equipment insulation such as water heaters or for board or foamed in type insulation for use in building structures and similar applications.

3 Claims, 5 Drawing Figures

INSULATION MEANS AND METHOD

FIELD OF THE INVENTION

This invention relates to heat transfer inhibitors and more particularly to improved insulation means and method.

BACKGROUND OF INVENTION

Since man first began to build free-standing structures, the problem of reducing heat loss has been a problem. Prior to the advent of inexpensive fossil fuels, only the inherent insulating qualities of the building materials themselves were used to control heat losses.

During the years of inexpensive fossil fuels there was very little concern with improving insulation for either building structures or equipment applications since the cost of insulating was generally much greater than the cost of the additional fuel to compensate for the heat loss.

With the sharply increasing cost of fossil fuels and the less availability of the same, insulation in more modern times has become an increasingly important technology. Ratings of various types of insulation have been standardized according to their insulation value and are referred to as "R-ratings". Products such as rock wool and fiberglass have been used to increase the insulation value for both structures and products where heat loss is a problem.

In more recent years, expanded ceramics have been experimented with as an insulating material. An example of such a product that is now commercially available is expanded perlite with a sodium silicate coating sold under the trade name "Fire-Guard" produced by Applied Ceramic Technology, Inc., of Rochester, Ind. This is a loose granular material which can withstand temperatures up to 2000 degrees Fahrenheit. Use of this material in building structures has been claimed to have an insulation value of R-70 for three inches of material. Laboratory tests, however, have disputed this claim with results showing R-8.1 for the same thickness or a R-value of 2.7 per inch versus the claimed 23.3 per inch. Although some validity for the higher claimed R-value may reside in moisture absorption and evaporation during cyclic periods, ceramic insulation certainly in and of itself does not have a stable high R-value.

Foam plastics such as urethane have an accepted higher R-rating than expanded ceramics (R-2.7 per inch for expanded perlite versus R-7 per inch for expanded urethane). The urethane, however, can only withstand surface temperatures in the neighborhood of 250 degrees Fahrenheit versus 2000 degrees Fahrenheit for the ceramic. Although urethane is used for insulating such things as coolers and drink containers, the same has not been widely accepted for uses such as insulating of water heaters and building structures because of its relatively low surface heat resistance.

BRIEF DESCRIPTION OF INVENTION

After much research and study into the abovementioned problems, it has been discovered that by combining an expanded ceramic material such as expanded perlite with an expanded plastic material such as urethane foam, the R-rating of the combination is not the sum of the two but is several multiples thereof. This discovery has allowed methods to be developed for producing structural insulations of predictable and stable high R-ratings while being resistant to high surface temperature. Also methods have been developed to produce original equipment insulation for devices such as water heaters which meet or exceed Federal energy requirements for stand-by loss in watts per square foot which until now have not been possible.

The above results are accomplished by combining layers of urethane insulation and layers of expanded ceramic insulation. Both the end products and the method of producing the same have novel connotations.

In view of the above, it is an object of the present invention to provide a method of producing a layered insulation having an R-rating of at least twice the sum of the R-rating of the layers individually.

Another object of the present invention is to provide a method of producing an improved insulation with an extremely high R-rating.

Another object of the present invention is to provide an insulation for a unit including an inner layer of urethane insulation and an outer layer of expanded ceramic insulation to achieve a R-value greater than the sum of the individual layers.

Another object of the present invention is to provide a method for producing an insulated water heater which meets EPA minimum loss requirements.

Another object of the present invention is to provide a structure insulating material with a predictable extremely high R-rating which also has a high surface heat resistance.

Other objects and advantages of the present invention will become apparent and obvious from a study of the following description and the accompanying drawings which are merely illustrative of such invention.

DETAILED DESCRIPTION OF DRAWINGS

Figure 1:
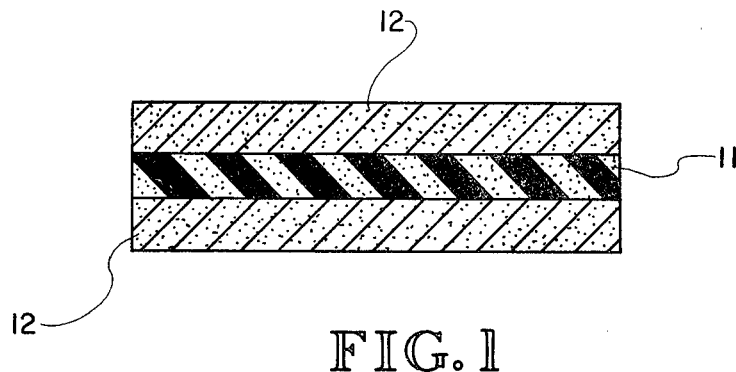
FIG. 1 is a sectional view showing the improved insulation means of the present invention.

With further reference to the drawings, a bi-directional insulation is shown in FIG. 1 wherein a layer of urethane foam 11 has a layer of expanded ceramic material 12 on either side thereof. If a board-like sheet of insulation is formed, the expanded ceramic insulation 12 would, of course, use a binder such as silicate. The silicate and ceramic are combined, placed in a forming mold and gased by 50 cubic feet of $CO_2$ per board foot of mixture forming $CO_3$. This allows for demolding within a two-minute period. The casting is then fired at 250 degrees for one hour to dry off excess moisture or placed in a microwave oven to obtain the same result.

For the core or heat conductive resistant path break layer, urethane (isocyanate), isophenol, and expanded styrene have been experimented with. Superior results have been regularly obtained with urethane foam cores and this is the material which will hereinafter be indicated as the core material 12.

Figure 2:
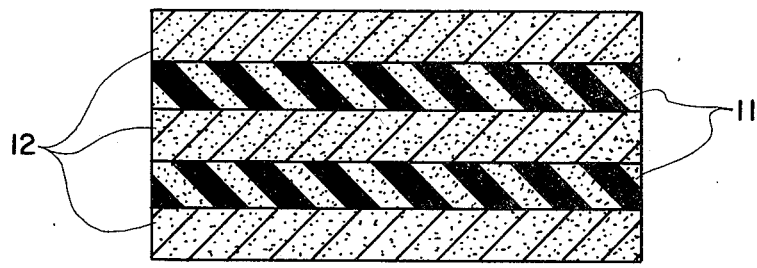
FIG. 2 is an alternate form of such insulation.
Figure 3:
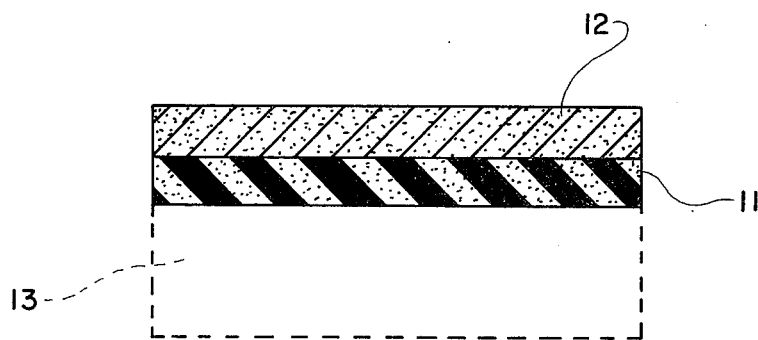
FIG. 3 is a sectional view of the insulation means of the present invention when used in conjunction with a heat sink.

In some applications, additional layering may be required to obtain a sufficient R-rating for the intended application of the end product. An example of this is shown in FIG. 2 wherein alternate layers of urethane foam and expanded ceramic insulation are disclosed. It should be noted that the outer layers are of ceramic material.

Where a heat sink type application is involved, such as the insulating of a water heater or other similar equipment, the urethane foam is placed on the side adjacent the heat source and the ceramic material is on the side opposite such source as illustrated in FIG. 3. This arrangement has been noted after extensive experimentation to give the best results.

In addition to the board insulation illustrated in FIGS. 1 and 2 and the heat sink or storage application illustrated in FIG. 3, a third application would be a sprayed in place installation such as above the ceilings of building structures. One or more inches of expanded granular perlite are blown in for the first layer 12 of ceramic material. One or more inches of urethane 11 is foamed in and the job is completed with one or more inches of additional perlite 12.

Referring more specifically to the heat sink application of the present invention, a heat source such as a hot water heater 13 has a standard heating element 14 provided therein. Also a thermostat 15 is provided along with normal wiring means 16. Since heating elements, thermostats and related electrically components are well known to those skilled in the art, further discussion of the same is not deemed necessary.

Figure 4:
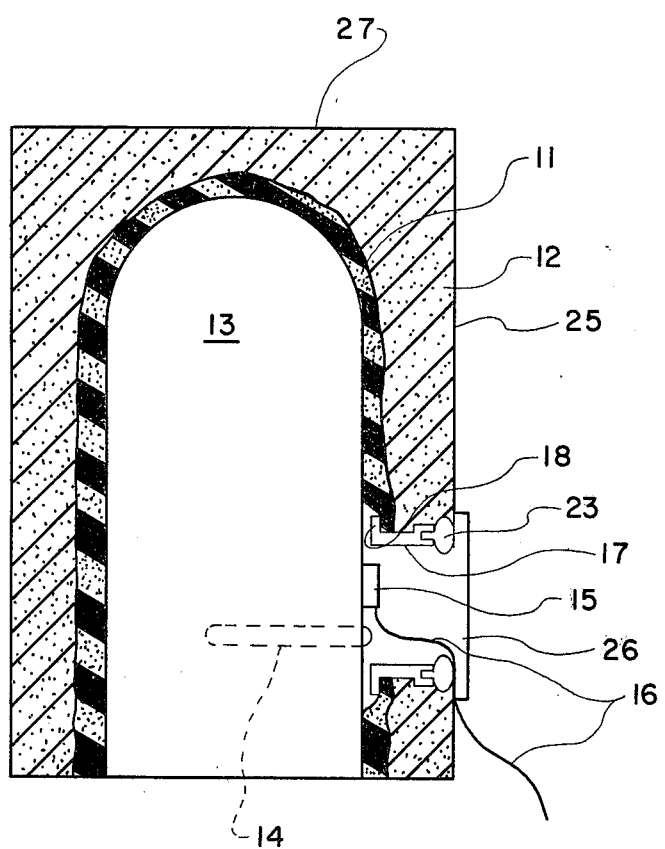
FIG. 4 is a somewhat schematic sectional view of the heat sink application used in conjunction with an electric type water heater.

To allow access to the thermostat, heating element, and related controls, a shroud 17 is provided. This shroud is intended to lie juxtaposed to heater tank 13 with the urethane insulation being foamed about shoulders 18 as seen clearly in FIGS. 4 and 5. Once the urethane has been foamed onto tank 13, the shroud will be held permanently in place thereby.

Figure 5:
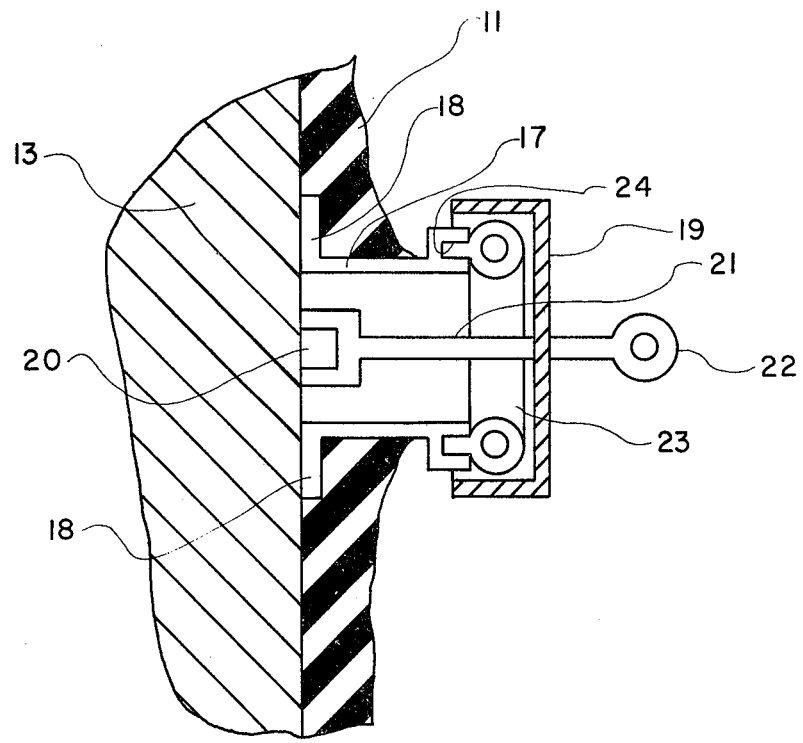
FIG. 5 is an enlarged fragmentary view of the access area of such heater.

One method of maintaining shoulder 18 of shroud 17 juxtaposed to tank 13 during the foaming process shown in FIG. 5 where a temporary plate cover 19 is retained by magnet 20 on arm 21. A handle 22 is also provided for removal of the plate cover once the urethane 11 has been foamed about shoulder 18 to retain the same.

A compressible bulb type gasket 23 is retained within groove 24 of shroud 17.

Once shroud 17 has been placed about the controls of the water heater and the urethane 11 has been foamed thereabout to the desired thickness, temporary plate cover 19 is removed and tank jacket 25 slipped thereover so gasket 23 is in sealing contact with the interior of such jacket. An opening is, of course, provided in the jacket 25 to allow access to the interior of shroud 17. Also when in use, an access plate or panel 26 will be installed. Since plates of this type are well known to those skilled in the art, further detailed discussion of the same is not deemed necessary.

Next the tank is filled with an expanded ceramic material 12 such as sodium silicate coated perlite having a moisture content of approximately 7 percent. While filling the area between jacket 25 and the urethane core 11, the entire device is vibrated to make sure that no voids are formed. The ceramic insulation, which is in granular form, can easily fill around shroud 17 and cover the sides and top of the urethane coated tank 13. Although insulation can also be added on the bottom of the tank through experimentation, this has not been found necessary due to the fact that water in the bottom of the tank, even in a static heating condition, will average up to 30 degrees cooler than the temperature at the top of the tank.

Once the jacket 25 has been filled, a top cap 27 can be added to complete the insulation process.

Comparative analysis of the present invention as hereinabove described with fiberglass and ceramic insulated water heaters are set forth as follows:

Test procedures for water heaters: Federal Energy Administration (FEA) as recorded in Federal Register, Tuesday, Oct. 4, 1977.

The three water heaters tested were approximately 40 gallon tanks with submerged electric elements. Tests for stand-by loss as it relates to the loss (watts per square foot) of tank area per hour per 90 degrees Fahrenheit temperature differential. All tanks had 2-inch jackets and 3-inch head space filled with insulation.

Tank 1—fibergalss insulation throughout—6.48 consumption

Tank 2—ceramic insulation with 7 percent moisture—5.60 consumption

Tank 3—urethane insulation throughout—4.47 consumption

Tank 4—$\frac{1}{4}''$ to $\frac{3}{4}''$ rough surface, sprayed on urethane layer directly against tank as conductive break (approximately 1 cubic foot of material) plus approximately 3 cubic feet of ceramic insulation with 7% moisture between urethane and outer jacket—2.45 consumption In addition to the above, further tests have been run to determine R-ratings on layered insulation with the following results:

| LAYER 1 | LAYER 2 | LAYER 3 | RESULTANT R |
|---------|---------|---------|-------------|
| 0 | 0 | 3″ ceramic with water glass binder | 14 |
| 0 | 3″ urethane | 0 | 15.5 |
| 1″ ceramic with sodium silicate | 1″ urethane | 1″ ceramic with sodium silicate | 45 |

Because of the unexpectedly high R-rating for the composite insulation of ceramic/urethane/ceramic, further tests were run with the following results:

| LAYER 1 | LAYER 2 | LAYER 3 | RESULTANT R | CALCULATED R* |
|---------|---------|---------|-------------|---------------|
| 1″ ceramic | 2″ | 1″ ceramic | 62 | 19.4 |
| 1″ ceramic | $\frac{3}{4}''$ | 1″ ceramic | 28 | 10.65 |
| 1″ ceramic | 1″ | 1″ ceramic | 45 | 12.4 |
| 1″ ceramic | $\frac{1}{2}''$ | 1″ ceramic | 25 | 8.9 |

*Calculations assuming perlite at R of 2.7 per inch and urethane at R of 7 per inch.

From the above, it can be seen that the insulation means and method of the present invention produces highly efficient results which are much better than the sum of the individual layered parts. Additionally, high surface heat resistant qualities are incorporated into and used in conjunction with less heat resistant materials.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. A composite insulation product having insulating qualities greater than the sum of the qualities of the individual portions comprising: at least two layers of sodium silicate coated expanded perlite type ceramic insulation; and at least one layer of urethane foam type insulation disposed adjacent to and between said ceramic insulation whereby an insulated product having superior insulating qualities is provided.

2. The method of producing an insulating product of superior quality comprising: coating a heat sink type means with a urethane foam type insulating material; placing a retaining means about said urethane coating in spaced relation therewith; and filling the void between the retaining means and urethane coating with granular sodium silicate coated perlite expanded ceramic insulating material whereby said heat sink can be insulated to a greater degree than the sum of the insulating qualities of the urethane foam and expanded ceramic material.

3. The method of claim 2 wherein the heat sink is a water heater type device.

* * * * *